United States Patent [19]
Trotta

[11] 3,814,906
[45] June 4, 1974

[54] MECHANICAL DATA MEMORY DEVICE HAVING HELICOID DATA CARDS AND PROGRAMMING MEANS THEREFOR

[76] Inventor: Michael Trotta, 2954 W. 8th St., Brooklyn, N.Y.

[22] Filed: Sept. 7, 1972

[21] Appl. No.: 287,108

[52] U.S. Cl.... 235/61.12 R, 235/61.1, 340/174.1 C
[51] Int. Cl.. G06k 17/00, G06k 19/00, G11c 13/00
[58] Field of Search...... 346/136, 137; 340/174.1 C, 340/357; 179/100.2 A; 235/61.11 R, 61.11 D, 61.11 E

[56] References Cited

UNITED STATES PATENTS

| | | | |
|---|---|---|---|
| 2,990,182 | 6/1961 | Cailliot | 346/137 UX |
| 3,019,421 | 1/1962 | Saylor | 346/137 |
| 3,160,466 | 12/1964 | Kumagai | 179/100.2 A |
| 3,307,021 | 2/1967 | Holland | 235/61.11 E |
| 3,448,247 | 6/1969 | Jones | 235/61.1 |
| 3,503,060 | 3/1970 | Goddard et al. | 340/174.1 C |

*Primary Examiner*—Thomas J. Sloyan
*Attorney, Agent, or Firm*—Pennie & Edmonds

[57] ABSTRACT

A numerical memory device having a card in the form of a helicoid having a number of turns adapted to have indicia marks on the card, where one complete turn of the helicoid represents a predetermined number of units and where a portion of the radius of the card represents a predetermined number of units such that in indicium mark on the card may represent a particular number. The card is mounted on a shaft and means are provided for rotating the shaft a predetermined amount.

Reading means are included to read indicia on the card and to activate an alarm when indicia are read. Programming means are provided with each reading means in order to impart indicia onto the card.

Each helicoid card comprises 100 turns, each turn comprising 1,000 units and the radius of the card represents 10 units such that each card may have 100,000 indicia thereon. A group of 10 cards may be mounted on a single shaft with a reading means for each card so that each shaft will carry cards capable of having one million indicia thereon. A number of shafts may be utilized whereby the device may be adapted to carry indicia in the amount of one million times the number of shafts.

7 Claims, 13 Drawing Figures

MECHANICAL DATA MEMORY DEVICE HAVING HELICOID DATA CARDS AND PROGRAMMING MEANS THEREFOR

FIELD OF THE DISCLOSURE

It is desirable that the numbers carried on such items as charge cards be quickly compared with a master list to determine if the card is still valid or should be withdrawn from circulation. In the past this has usually entailed manually checking a number on a card with printed releases distributed periodically by the service offering the charge card. This has been a cumbersome and not entirely accurate procedure due to the delay occasioned in printing and distribution of the status sheets, the necessity in some instances of consulting more than one status sheet, and the possibility of errors arising in comparing long lists of printed numbers.

Some installations have utilized a centralized computer service in which the person to whom the charge card is presented telephones a centralized station wherein the numbers are checked by computer means. This system also has not been entirely satisfactory as it involves use of an expensive central computer installation, the necessity of using long distance telephone lines and possible delays in obtaining a circuit.

It is a purpose of the invention to provide a numerical memory device which is inexpensive to make, which requires no extensive training to operate and which may quickly compare numbers and give a positive indication of numbers compared. It is a further purpose and object of the invention to provide a memory device which may be conveniently programmed by the operator to program in numbers which are to be compared, i.e., valid charge card numbers with a record of invalid numbers.

GENERAL DESCRIPTION OF THE INVENTION

Broadly, the invention contemplates the use of a card or memory bank which is in the form of a helicord having a plurality of turns or threads. Each complete turn of the card represents a predetermined number of units, for example, 1,000, and a portion of the radius of the card may represent a smaller number of units, for example, 10. Thus any particular indicium on a single turn of the card which is prepositioned radially and circumferentailly may represent any number 0–999. If the card has 100 turns of threads, then the card may carry 100,000 indicia. The card in turn is mounted on a rotatable memory shaft and means are included, i.e., an electric motor, which may rotate the shaft a predetermined amount. Reading means are provided which extend radially along a turn or thread of the card to read any indicia thereon. Where a portion of the radius of the card represents 10 units, ten single unit readers would be utilized.

A group of 10 cards is mounted on a single memory shaft and each card has its associated reading means. The cards on each shaft may then carry one million indicia and the reading means may then read any one of these indicia. A plurality of memory shafts may be provided which are operatively connected for common rotation whereby the memory device may carry one million indicia times the number of shafts.

Selector switch means are provided for controlling flow of current to the electric motor and thus provide a regulation of rotation of the memory shafts. A first selector switch means, a ten thousands selector unit switch having 10 contacts, serves to control rotation of the motor and shaft to the selected 10 of 100 turns of a card. A second selector switch means, a thousands unit selector switch having 10 contacts, serves to control rotation of the motor and shaft to a particular one of the ten turns of the card selected by the first selector switch. A third selector switch means, a hundreds unit selector switch having 10 contacts, serves to control rotation of the motor and shaft to one-tenth of a complete revolution of the shaft and at the same time reduces current flow to the motor to slow it down. A fourth selector switch means, a tens unit selector switch having 10 contacts, serves to control rotation of the motor and shaft to one-tenth of the previous tenth of a rotation, i.e., one hundredth of a complete rotation, and at the same time applies a brake to a motor.

A unit selector switch means having 10 contacts is provided for selecting which of the 10 unit readers is to be activated in order to read the last digit of a number to be checked. In addition hundred thousands selector switch means are provided for activating the reading means associated with a particular card. Millions unit selector switch means are provided for completing the electrical circuit to an alarm and to ground.

Each of the ten thousands unit, one thousands unit, one hundreds unit and tens unit selector switch means control flow of current to 10 cam operated switches mounted in line with the cams positioned on a shaft rotated by the same electric motor that rotates the memory shafts. The 10 cams are positioned evenly around the shaft such that one of the 10 cam operated switches is always in an open position. The 10 cam operated switches associated with a particular selector switch means has circuitry such that current flows from the selector switch means into a selected one of the cam operated switches and then through adjacent cam operated switches to a relay operating the electric motor, the direction of flow being determined by the open switch through which current cannot flow. The motor then rotates the memory shaft and cam shaft until the selected cam operated switch is opened after which the current then passes to a further unit selector switch where the operation is duplicated. The current after flowing through the unit selector switches, then passes through the single digit selector switch, through the reading means which comprises a bulb-photocell combination, through a millionths selector switch, through an alarm system and on to ground.

The memory device also may incorporate a programming means in the form of a solenoid operated punch associated with each bulb-photocell combination. The punch solenoid when energized will punch a perforation into the card to program the same. Each punch solenoid is in parallel with a bulb-photocell combination and includes a separate programming switch for completing a circuit between the single digit unit selector switch and a millionths selector switch.

DETAILED DESCRIPTION OF THE INVENTION

Figures 1, 2:
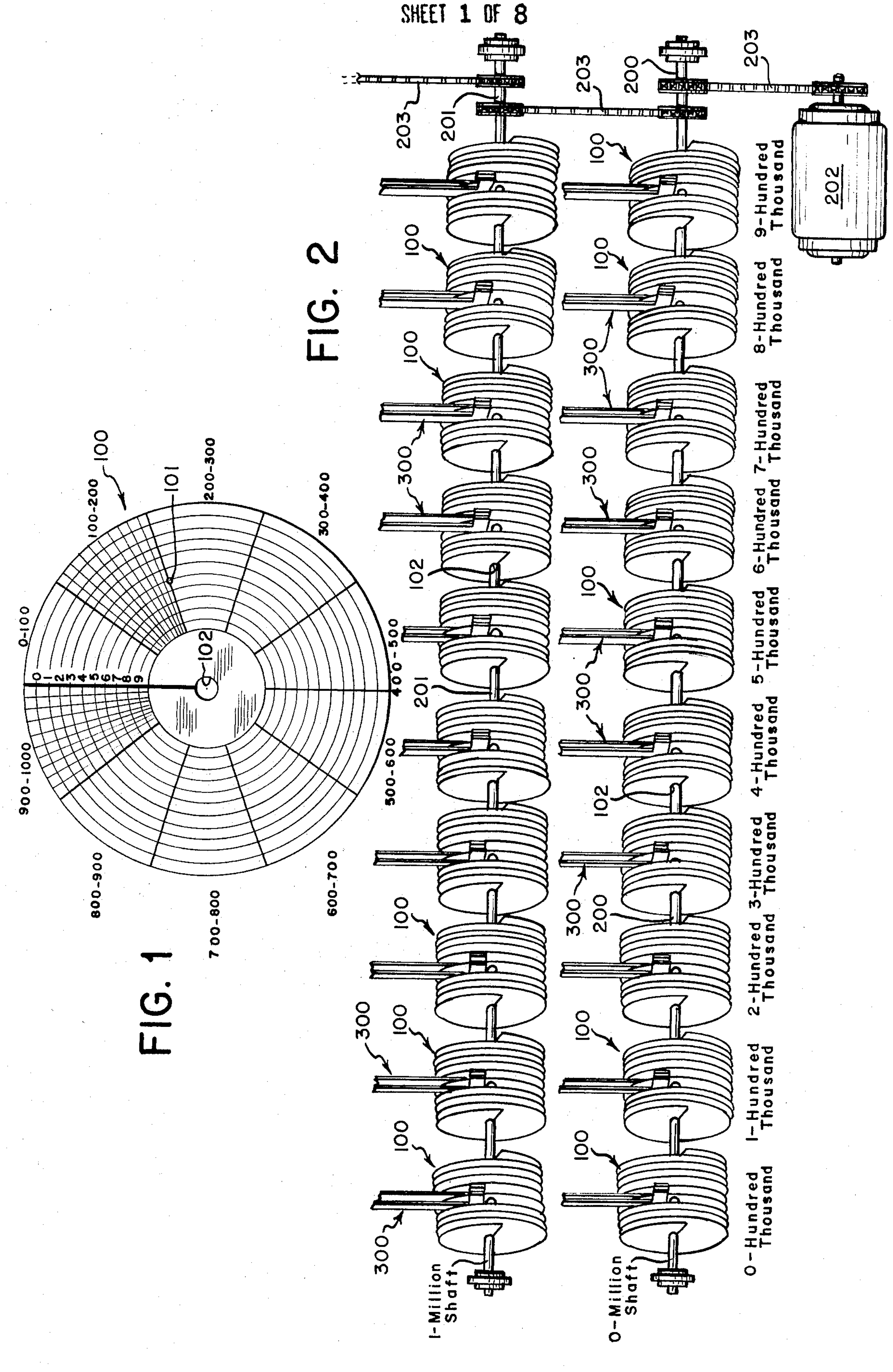
FIG. 1 is an end view of a card or memory bank used in a memory device constructed according to the invention.
FIG. 2 is a diagrammatical view of a plurality of cards as shown in FIG. 1 mounted on rotatable memory shafts and having reading means associated with each card.

Referring to FIG. 1 there is illustrated an end view of a card or memory bank 100 in the form of a helicoid having a number of turns or threads. For ease of description, the card of FIG. 1 is shown graduated around the circumference of the first turn into one hundred units and a portion of the card in the radial direction is graduated into 10 units. Thus, the first turn of the card represents 0–999 units, the second turn 1,000–1,999 units and so on. If it is desired to mark the card with an indicium to indicate a particular number, for example, 205 one counts over 20 units on the circumference of the turn and down five units on the radius where an indicium 101 may be marked. The card has a center cut out or bore portion 102 in order that it may be mounted on a shaft. While the card illustrated in FIG. 1 is divided circumferentially into units of 100, it is apparent that a different unit of numbering could be utilized. The card 100 preferably is made of paper or other flexible material and one in which perforations may be easily made in order to make indicia marks thereon.

Referring to FIG. 2, there are shown a number of cards 100 mounted on rotatable memory shafts 200 and 201. Each card 100 has 100 turns or threads. However, for convenience, the cards in FIG. 2 are shown having only 10 turns or threads. Shafts 200 and 201 are rotated by a reversible electric motor 202 and the shafts are geared together by chain drives 203 for common rotation. Additional memory shafts and cards may be utilized if needed and these additional shafts would also be connected for common rotation with shaft 200. As each turn of each card represents 1,000 units, a card of 100 turns represents 100,000 units. Each shaft carries 10 cards so that the cards carried by the shaft represent one million units. For convenience as shown the first card one is referred to as zero one hundred thousand; the second card as one hundred thousand; and the third card two hundred thousand and so on to nine hundred thousand. The memory shaft 200 is referred to as the zero one million shaft. Shaft 201 which also carries 10 cards may be referred to as the one million memory shaft. Further shafts, not shown, would likewise be referred to as the two million memory shaft and so on.

Figures 3, 4:
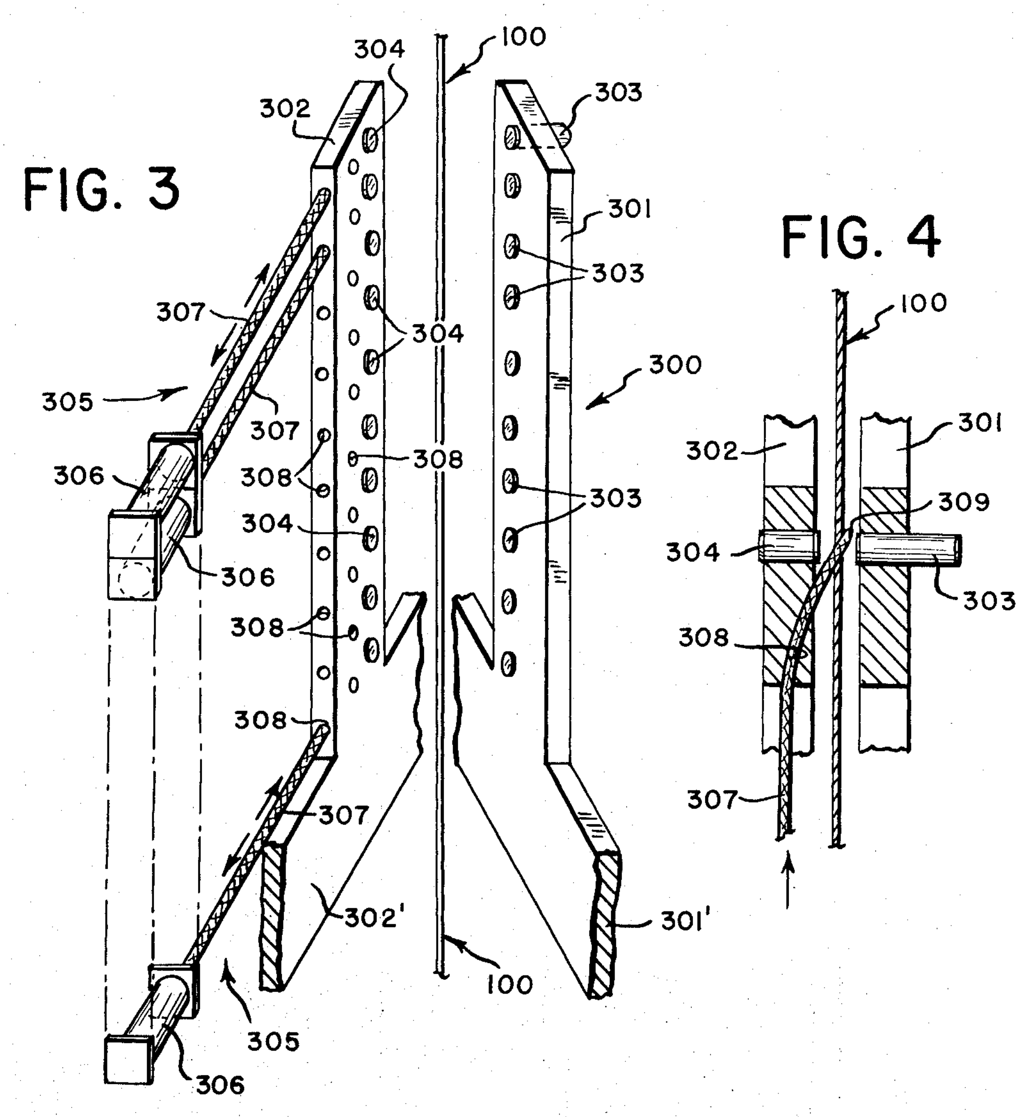
FIG. 3 is a partial sectional view of a reading and programming means of the type shown in FIG. 2 with the parts separated.
FIG. 4 is a plan sectional view of the reading and programming means illustrating engagement of the programming means with a card.

Each card has associated therewith a reading means 300 which as shown in FIG. 3, comprises two T-shaped bars 301 and 302 which extend down on either side of a thread or screw of the card 100. As the T-bars are fixed with respect to the cards, provision must be made to accommodate the relative axial movement of the turns or threads of the cards when they are rotated by the memory shafts. This is accomplished by having the cards comprise a flexible material, such as paper, which will allow each turn or thread to flex sufficiently that the T-bars may engage all of the turns or threads of a single card. The lower cross sections 301′ and 302′ of the T-bars act as guides to insure that the threads will remain between the T-bars when the memory shafts are rotated to the limit of rotation, i.e., beginning of the first turn and end of the last turn of each card.

The T-bar 301 has therein a plurality of photocells 303 arranged in a radial direction with respect to the card and memory shaft. The T-bar 302 has a plurality of bulbs 304 also arranged radially with respect to the card. Each combination of a bulb 304 and an axially opposite photocell 303 form a unit reader. When a turn of a card is positioned between the T-bars 301 and 302, the card will block off transmission of light from the bulb 304 to the photocell 303. If there is a perforation in the card to indicate a particular indicium, light will be transmitted through the perforation to energize the photocell which, as explained hereafter, in turn may activate an alarm.

The T-bar 302 also has mounted thereon a programming means 305 which comprises a plurality of electric solenoids 306 each of which moves a flexible punch rod 307 through a curved or slanted bore 308 in the T-bar whereby the end of the rod 309 of the flexible punch rod may make a perforation in the card 100. Each bulb of the reading means has a programming means associated therewith. As shown in FIG. 3, 10 bulbs are included in the reading means along with 10 photocells to make 10 unit readers. 10 programming means are also included, but, for convenience, only three have been shown.

Figure 7:
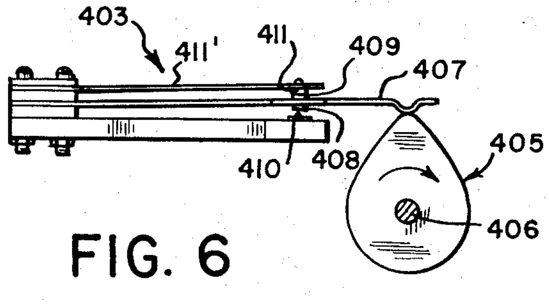
FIG. 7 is an enlarged view of FIG. 5B taken along lines 7—7.
Figure 6:
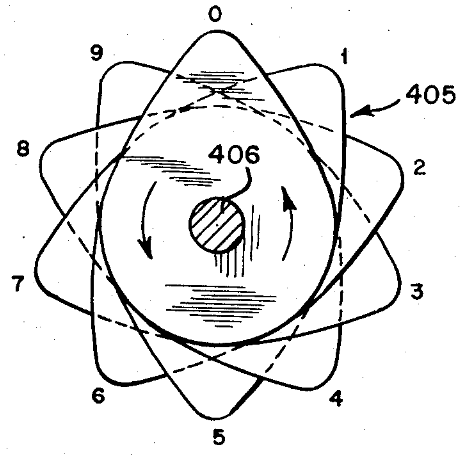
FIG. 6 is a view of FIG. 5B taken along lines 6—6.
Figure 5A:
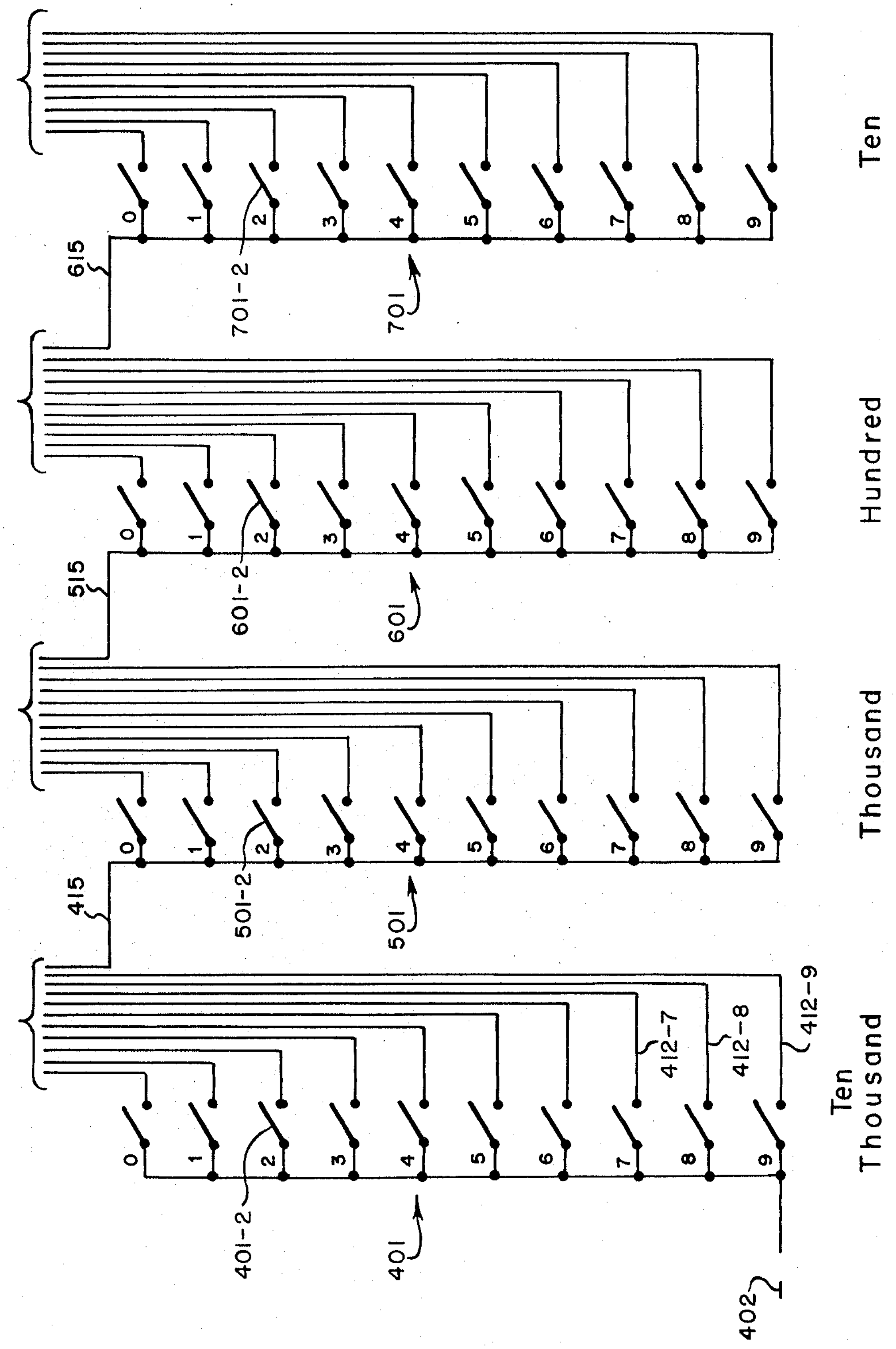
FIG. 5A is a schematic of unit selector switches used in selecting numbers to be read by the memory device.
Figure 5B:
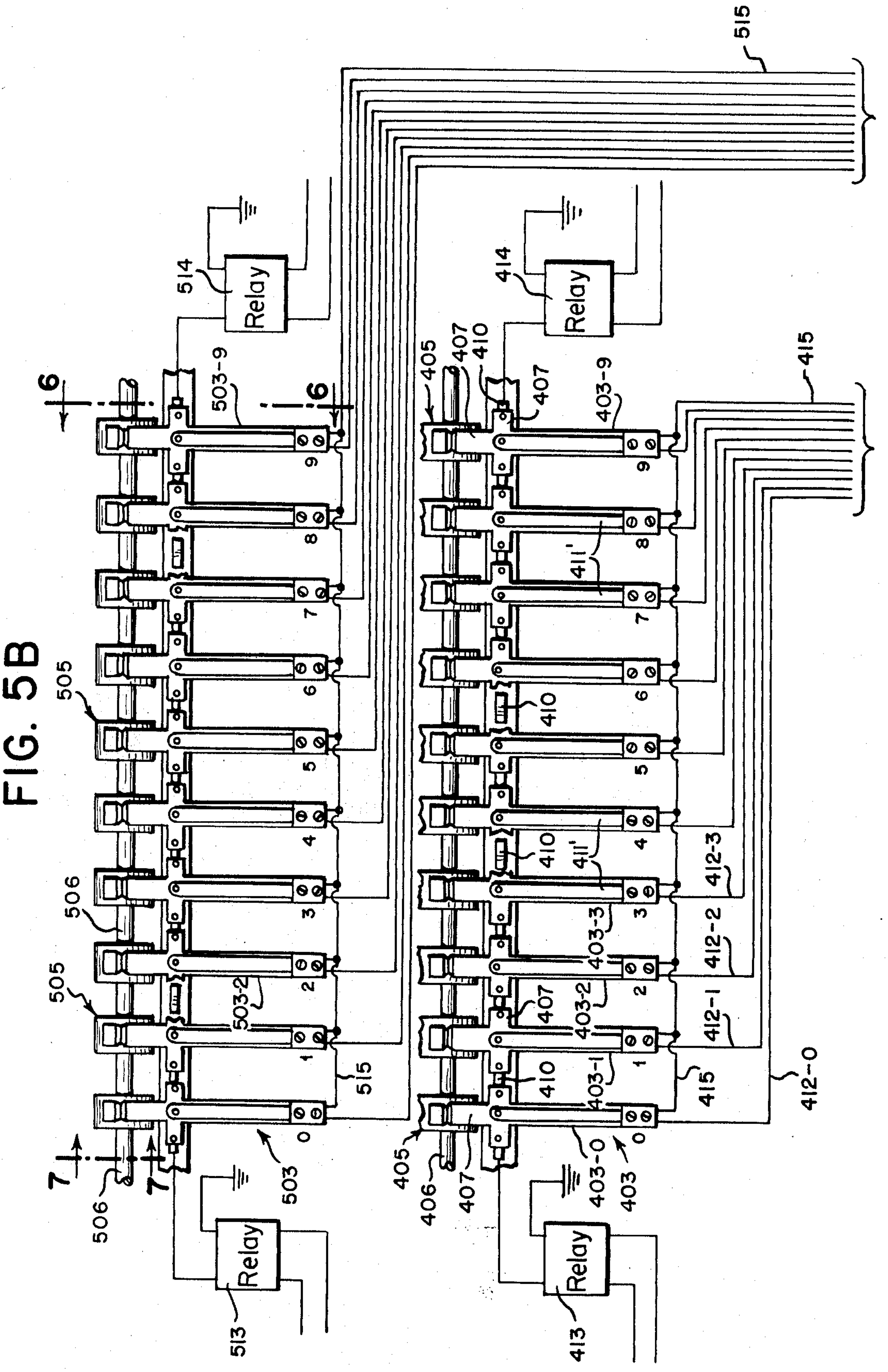
FIGS. 5B and 5C are schematic diagrams of cam operated switches for directing current to relays for controlling rotation of a reversible electric motor.
Figure 11:
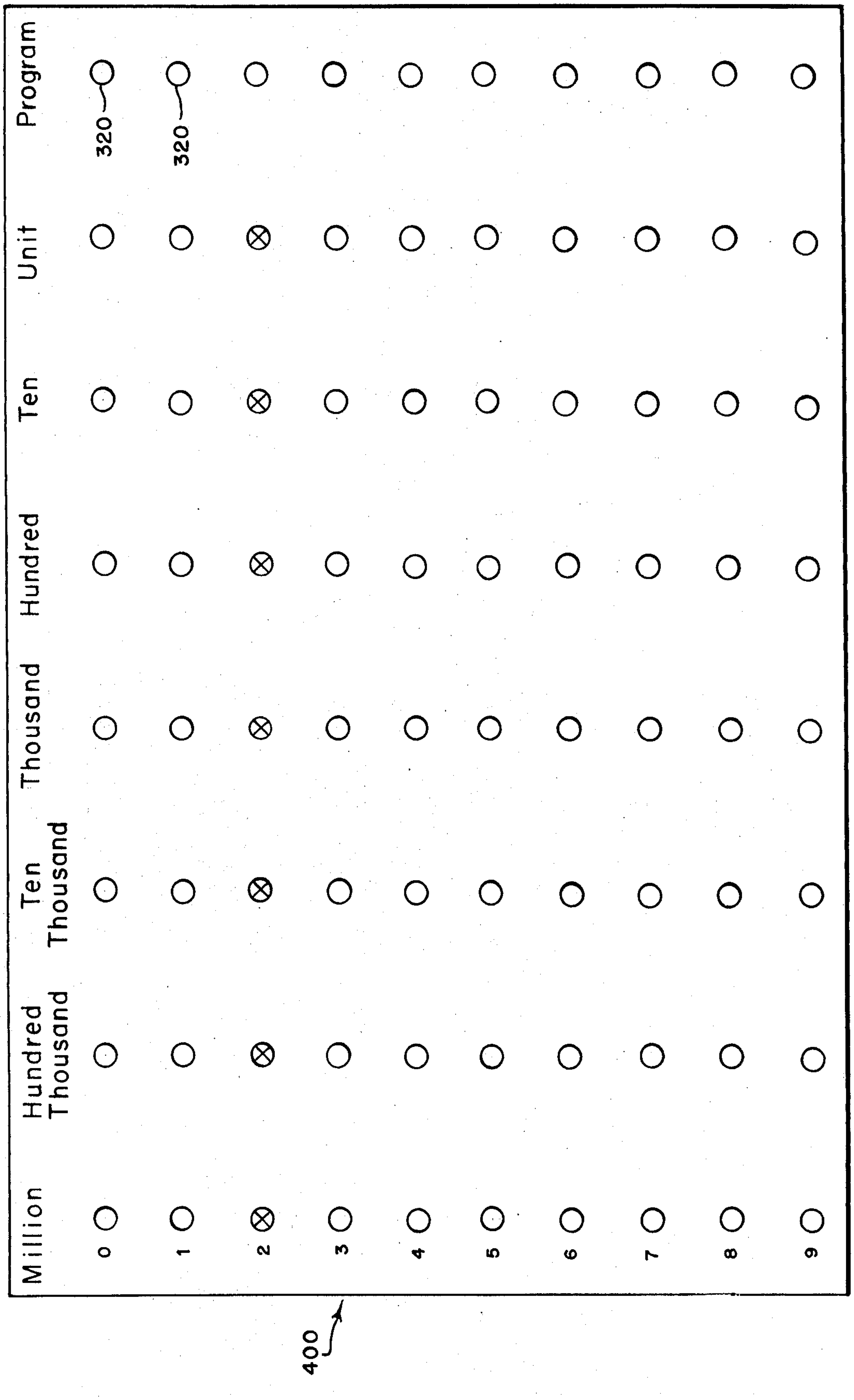
FIG. 11 is a view of a control panel for setting the numbers to be checked and for programming numbers into the cards.

The means and manner in which the reversible electric motor 202 rotates the memory shafts is explained by reference to FIGS. 5A–5C. The number to be checked or compared is set in the panel 400 as shown in FIG. 11 by pressing the desired switches. Closing one of the 10,000 unit selector switches 401 allows current to flow from the source 402 through one of the switch contacts 0–9 to a selected one of 10 cam operated switches 403 as shown in FIG. 5B. These 10 switches as shown in FIG. 5B are mounted in line and are adapted to be operated by cams 405 mounted on a cam shaft 406. The cams 405 are evenly distributed around the cam shaft as shown in FIG. 7 such that the rise of one of the cams will always be in a position to keep one of the ten switches open as shown in FIG. 6.

Switch 403 as shown has a movable blade 407 which contacts the cam and is moved by the cam rise. Contacts 408 and 409 are provided on the blade. When the blade is in the down position, i.e., when not contacted by the cam rise, contact 408 will engage conductor 410. When the blade is in the raised position as shown in FIG. 6, contact 409 will engage contact 411 carried by bar 411'. Current flows into the switches 403 through leads 412 from the hundreds unit selector switch 401 and into blade 407. When the blade is in the down position so that contact 408 engages conductor 410, current will flow through conductors 410 and through the contacts 408 of adjacent switches and on to one of the relays 413 or 414. Relays 413 and 414 in turn control current flow to the reversible electric motor 202. However, since one of the switches 403 is always in an open position, i.e., engaged by a rise of the cam, current cannot flow through that open switch to an adjacent switch and into a relay. For example, if the number 3 contact of switch 401 is closed, current will flow into the blade of switch 403-3. If the blade is inn the down position, current will tend to flow either to the left or to the right of the switch. If, however, the cam rise of the cam operation switch 403-1 is in the up position, switch 403-1 will open breaking current flow to relay 413. Current would then flow through conductors 410 and switches 403-4 to 403-9 and into relay 414 causing the motor to rotate in a predetermined direction. On the other hand, if a switch on the right side of switch 403-3 were open, for example switch 403-5, current could not flow to relay 414 but instead would flow to relay 413 causing the motor to rotate in the opposite direction.

The cam shaft 406 is driven by the electric motor so that this cam shaft will continue to rotate until the cam rise of the selected cam operated switch opens that switch. For example with switch 403-3 as the selected switch, current will continue to flow to a motor relay until the blade of that switch is lifted by its cam rise. At this point, contacts 408 will open with respect to conductor 410 thus breaking the circuit to the motor relays. At the same time contact 409 will engage contact 411 and current will flow through bar 411' to line 415. Line 415 extends to the thousand unit selector switch 501.

Switch 501 in turn allows current to flow to one of the cam operated switches 503. The construction and operation of these switches is the same as for switch 403. Current will then flow to the motor to rotate the memory shafts as well as the cam shaft 506 until a cam rise will open the selected cam operated switch 503. When this occurs, current will flow through line 515 to a hundred unit selector switch 601.

Figure 5C:
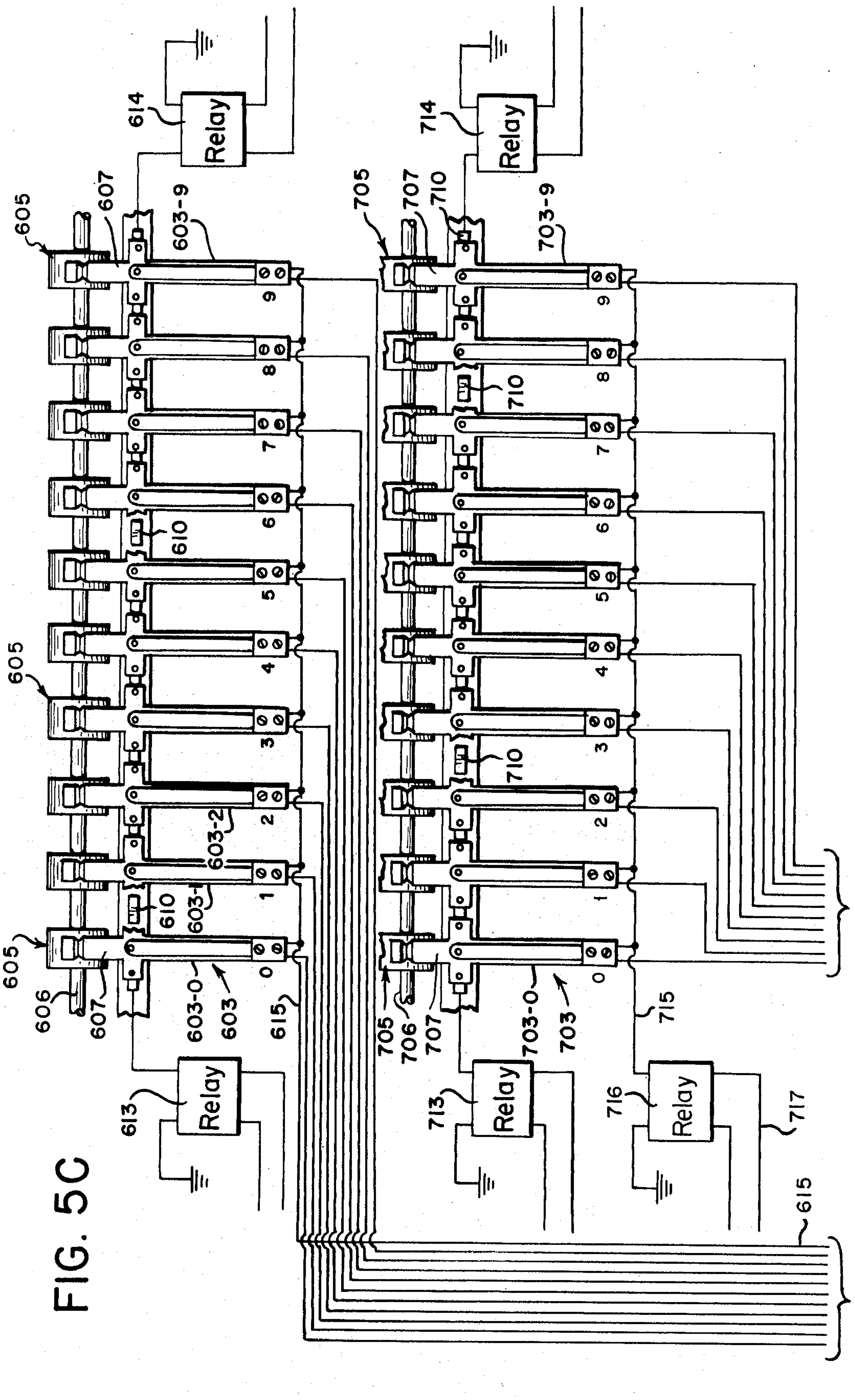

From switch 601, current flows to a selected cam operated switch 601 as shown in FIG. 5C which arrangement is the same as that of switches 403 and 503. The relays 613 and 614 associated with switches 603 in addition to controlling rotation of the electric motor, provide for reduction of voltage to the motor such that it will rotate at a slower speed when indexing to a tenth part of a revolution. Current flows from the switches 603 when the selected switch is opened by the cam rise through line 615 to the 10 unit selector switch 701.

The 10 unit selector switch 701 in turn selects which of the switches 703 is to open to stop current flow to the motor. This switch arrangement, in addition to having the relays 713 and 714 for controlling current flow to the motor, in addition has a brake relay 716, which when energized, will apply a brake to the motor to lock the drive shaft from rotation and also supply current to line 717 leading to a hundred thousands selector switch. This in turn will lock all the memory shafts as well as the cam shafts from rotation. In addition relays 713 and 714 drop the voltage to the motor further to its slowest operating speed when indexing to the hundredth part of a revolution.

Figures 9, 10:
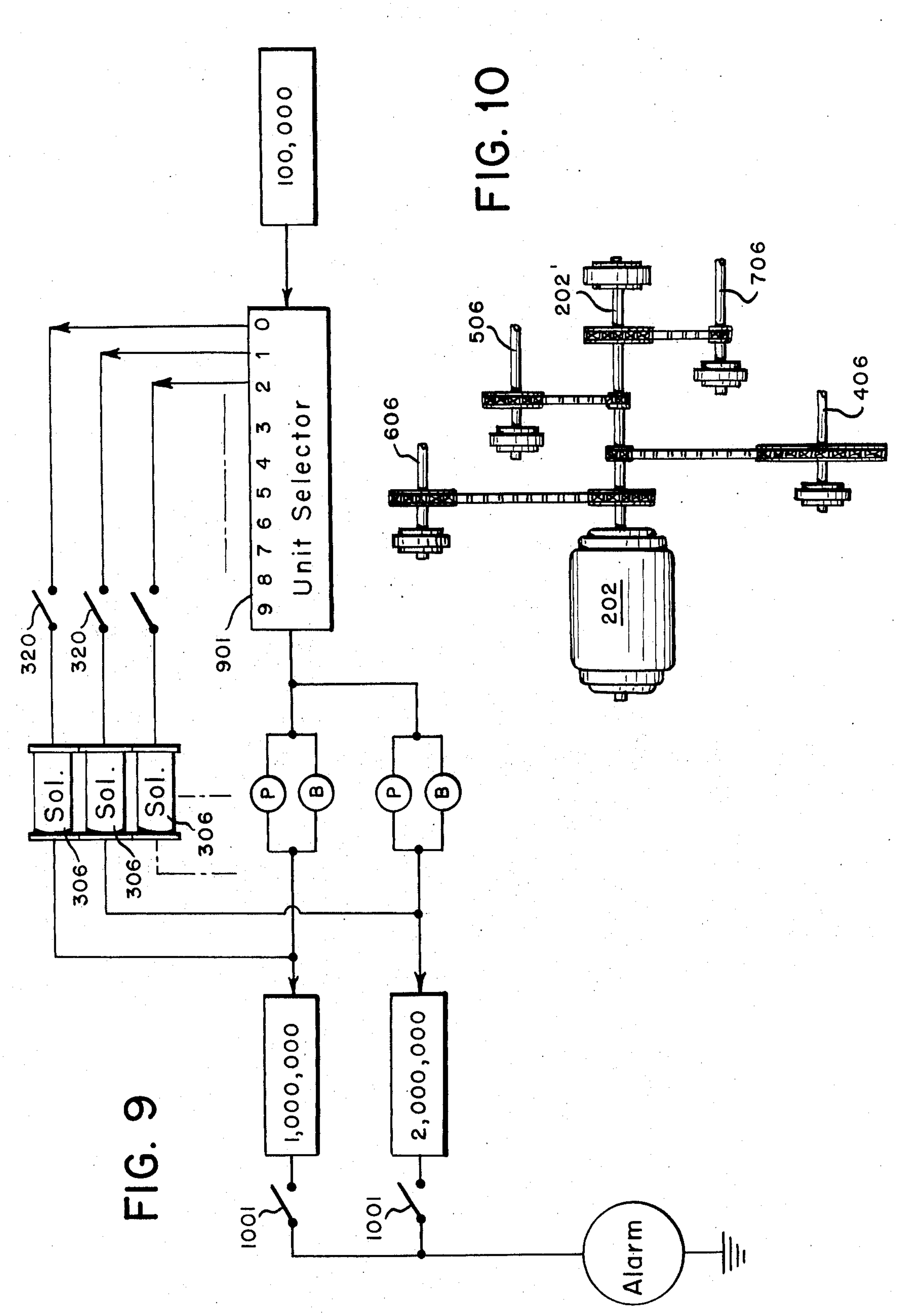
FIG. 9 is a schematic diagram of the circuitry of the programming means.
FIG. 10 is a view illustrating the interrelation of cam shafts operating the switches of FIGS. 5B and 5C.

All of the cam shafts are driven by the motor 202 as shown in FIG. 10. Since, however, the cam shafts are used to control different amounts of rotation, it is necessary that provision is made for varying the speed of rotation between the respective shafts. This is done by varying the size of the sockets of the chain drive connecting the various cam shafts. The relation is such that 100 rotations of the memory shaft 200 are equal to one turn of the shaft 406, 10 turns of the shaft 200 to one turn of the shaft 506, one turn of the shaft 200 to one turn of the shaft 606 and one turn of the shaft 200 to ten turns of the shaft 706. As shown, the memory shaft is connected directly to the motor for one-to-one rotation so that rotation of the motor drive shaft 202' is the same as for memory shafts and the cam shaft drives can thus be connected to the motor drive shaft.

Figure 8:
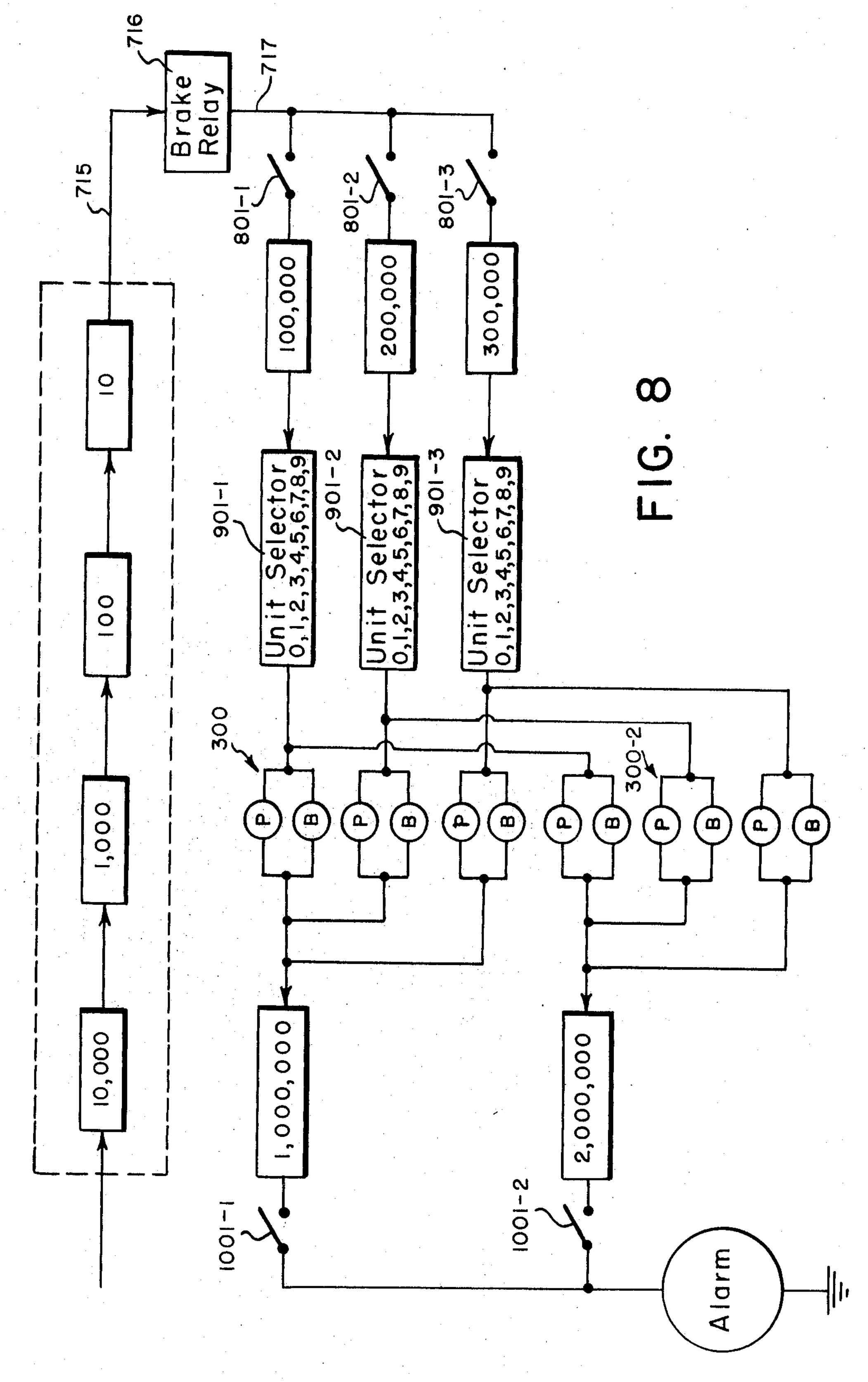
FIG. 8 is a schematic diagram illustrating the flow of current through the various selector switches and reading means.

As shown in FIG. 8, current flows from the ten selector switch after the motor stops rotating and the brake relay is energized through line 717 to a hundred thousands unit selector switch 801 which is the same in construction as switch 401. From the hundred thousands switch, current flows to a unit selector switch 901 which is also wired similar to switch 401. From the unit selector switch, which is used to select the last digit of the number to be compared, current flows to the reading means 300 which comprises a bulb B and a photocell P. From the reading means, current passes through a million unit selector switch 1,001 which is constructed in the same manner as switch 401. From the million switch, current may flow through an alarm, or a relay to operate an alarm, to ground. If the photocell is energized by light from the bulb B passing through an aperture in a card, then sufficient current will flow through the system to activate the alarm.

When a particular hundred thousand unit selector switch 801 is closed, for example, the two hundred thousand switch, the reading unit of the two hundred thousand card on each memory shaft will be actuated. However, only one of the reading units will be connected to ground by a million unit selector switch.

The complete operation of the device is as follows. If for example the machine is to be used to check the validity of a credit card having the number 2,222,222, this number is then punched into the panel illustrated in FIG. 11 by pressing the buttons marked X. Pressing the ten thousand button which is the equivalent of the switch 401-2 shown in FIG. 5A will cause current to flow from the source to switch 403-2 and cause the motor and memory shaft to rotate to the desired ten thousand portion of a card. When that point is reached, switch 403-2 will open, current will flow to the thousand selector switch 501 through the contact 2 of that switch and onto switch 503-2. This will cause current to flow to the motor to rotate the memory shaft to the selected thousand. At this point, switch 503-2 will open and current will flow to the hundred selector switch 601. Current will flow through contacts 601-2 to switch 603-2 causing the motor to rotate at a slower speed to a desired tenth of a rotation. When that point is reached, switch 603-2 will open causing current to flow to the ten selector switch 701. Current will then flow through contacts 701-2 to switch 703-2 causing the motor to rotate at a still slower speed to a selected hundredth of a revolution. When this point is reached, switch 703-2 will open breaking the circuit to the motor and applying a brake. Current will then flow from the brake relay to the hundred thousand selector switch 801-2. From there the current flows to the unit selector switch 901-2, through unit reader 300-2 shown in FIG. 8 to the million unit selector switch 1001-2. If there is a perforation through which the light in the bulb B may pass through the photocell P, sufficient current will pass through the alarm to ground to activate the alarm.

The circuitry for the programming means is disclosed in FIG. 9. If it is desired to program a particular number into the machine, the number is inserted by activating the desired unit selector switches of the panel as shown in FIG. 11. This will cause the motor to rotate the memory shafts until a portion of a card representing that particular number is opposite a reading means. The program switch 320 for the last digit of that number is then pressed which will energize the punch solenoid for that number to punch a perforation into the card. When the punch withdraws, light from the bulb B will pass through to the photocell P to activate the alarm which will then give a positive indication that the particular number programmed has in fact been programmed into the card or memory bank.

While I have described a memory bank utilizing a number series based on a factor of 10, it is apparent that the memory bank could be programmed using different factors. Also while I have shown the use of a bulb-photocell combination as a unit reader, again other structure could be used, as for example a magnetic reader responsive to magnetic indicia or film.

I claim:

1. A numerical memory device comprising a rotatable memory shaft, a reversible electric motor for rotating said memory shaft a predetermined amount, a card in the form of a helicoid having one hundred turns coaxially mounted on said shaft and fixed for rotation therewith wherein one complete rotation of said card represents one thousand units and wherein the radius of said card represents 10 units, a ten thousands unit selector switch for directing current to said motor to rotate said shaft a first predetermined number of revolutions, a thousands unit selector switch for directing current to said motor for rotating said shaft a second predetermined number of revolutions less than said first predetermined number, a hundreds unit selector switch for directing current to said motor for rotating said shaft a first predetermined fraction of a single revolution, a tens unit selector switch for directing current to said motor for rotating said shaft a second predetermined fraction of a single revolution less than the first predetermined fraction whereby rotation of the shaft can be controlled to one thousandth of a single revolution, brake means operable by said tens unit selector switch to brake rotation of said motor, a fixed radially extending reading means including ten radially extending unit readers positioned adjacent a turn of said card where each unit reader may selectively read any one of 10 indicia along a radius of said card at any predetermined circumferential portion thereof, and a single unit selector switch for selecting one of the 10 unit readers to be utilized whereby said reading means may read any one of one hundred thousand indicia on said card.

2. A numerical memory device according to claim 1 having a group of 10 said cards on said shaft with each said card having associated reading means and selector switches and having in addition a hundred thousand unit selector switch for each card whereby the reading means for any one card may be utilized to read any one of one million indicia on said group of cards.

3. A numerical memory device according to claim 2 having a plurality of shafts operatively connected together for common rotation each mounting a group of 10 said cards wherein each card has associated reading means and selector switches and having in addition a one million unit selector switch for each shaft whereby the reading means for cards on a particular shaft may be utilized to read any one indicia of the million indicia adapted to be carried by the group of cards on that shaft.

4. A numerical memory device according to claim 1 having in addition a solenoid operated punch associated with each unit reader adapted to punch perforations into the card to make an indicium thereon and having in addition a program selector switch associated with each said single unit switch for selecting the particular solenoid operated punch to be energized whereby the numerical memory device may be programmed.

5. A numerical memory device according to claim 1 wherein each unit reader comprises a bulb and a photocell combination wherein said photocell is adapted to be energized by light from said bulb, wherein the indicia comprises perforations in said card, and where said bulb and photocell of a combination are positioned on axially opposite sides of a turnn, and having in addition an alarm means activated by energization of said photocell.

6. A numerical memory data device comprising a rotatable memory shaft, a reversible electric motor for rotating said memory shaft a predetermined amount, a card in the form of a helicoid having a predetermined number of turns coaxially mounted on said shaft and fixed for rotation therewith wherein one complete rotation of said card represents a first predetermined number of units and wherein the radius of said card represents a second predetermined number of units, a first selector switch for directing current to said motor to rotate said shaft a first predetermined number of revolutions, a second selector switch for directing current to said motor for rotating said shaft a second predetermined number of revolutions less than said first predetermined number, a third selector switch for directing current to said motor for rotating said shaft a first predetermined fraction of a single revolution, a fourth unit selector switch for directing current to said motor for rotating said shaft a second predetermined fraction whereby rotation of the shaft can be controlled to a small fraction of a single revolution, brake means operable by said fourth unit selector switch to brake rotation of said motor, a fixed radially extending reading means including a plurality of radially extending unit readers positioned adjacent a turn of said card where each unit reader may selectively read any one of a plurality of indicia along a radius of said card at any circumferential portion thereof, and a unit reader selector switch for selecting one of a plurality of unit readers to be utilized whereby said reading means may read any one of a plurality of indicia on said card.

7. A numerical memory device comprising a rotatable shaft, a reversible electric motor for rotating said shaft a predetermined amount, a card in the form of a helicoid having a plurality of turns coaxially mounted on said shaft and fixed for rotation therewith and wherein one complete revolution of said card represents a first predetermined number of units and wherein a portion of the radius of the card represents a second predetermined number of units, card rotation switch means for selectively controlling rotation of said motor, a fixed radially extending program means positioned adjacent a turn of said card including a solenoid operated punch for each of said second predetermined number of units with the punches positioned in a line extending radially of the card and imparting circumferentially and radially pre-positioned indicia on said card, program switch means for selectively operating each said punch, individual reading means associated with each said punch for reading indicia imparted on said card by each said punch, and reader switch means for selectively operating said individual reader means whereby said reader means may read indicia imparted to said card by an associated punch means without moving said card.

* * * * *